United States Patent [19]

Glockmann et al.

[11] Patent Number: 4,884,289

[45] Date of Patent: Nov. 28, 1989

[54] X-RAY SCANNER FOR DETECTING PLASTIC ARTICLES

[75] Inventors: Walter Glockmann, Schlangenbad; Thomas Herwig, Eltville, both of Fed. Rep. of Germany

[73] Assignee: Heimann GmbH, Fed. Rep. of Germany

[21] Appl. No.: 52,981

[22] Filed: May 22, 1987

[30] Foreign Application Priority Data

May 28, 1986 [DE] Fed. Rep. of Germany ....... 3617893

[51] Int. Cl.$^4$ ............................................. G01V 23/04
[52] U.S. Cl. ........................................ 378/57; 378/62; 378/69; 378/86; 378/90
[58] Field of Search .................... 378/7, 51, 57, 62–63, 378/68–69, 87, 90, 86–88

[56] References Cited

U.S. PATENT DOCUMENTS

| 28,544 | 9/1975 | Stein et al. | 378/146 |
|---|---|---|---|
| 3,808,444 | 4/1974 | Schneeberger et al. | 378/57 |
| 3,832,545 | 8/1974 | Barrko | 378/57 |
| 3,965,353 | 6/1976 | Macovski | 378/87 |
| 4,020,346 | 4/1977 | Dennis | 378/57 |
| 4,123,654 | 10/1978 | Reiss et al. | 378/87 |
| 4,149,080 | 4/1979 | Schittenhelm | 378/7 |
| 4,228,351 | 10/1980 | Show et al. | 378/90 |
| 4,277,686 | 7/1981 | Harding | 378/6 |
| 4,366,382 | 12/1982 | Kotowski | 378/57 |
| 4,383,327 | 5/1983 | Kruger | 378/19 |
| 4,599,740 | 7/1986 | Cable | 378/57 |
| 4,799,247 | 1/1989 | Annis et al. | 378/57 |

FOREIGN PATENT DOCUMENTS

| 0105618 | 4/1984 | European Pat. Off. . | |
|---|---|---|---|
| 0153786 | 9/1985 | European Pat. Off. | 378/7 |
| 0184247 | 6/1986 | European Pat. Off. . | |
| 0123276 | 10/1986 | European Pat. Off. . | |
| 2461877 | 7/1976 | Fed. Rep. of Germany . | |
| 8133279 | 5/1986 | Fed. Rep. of Germany . | |
| 2083969 | 3/1982 | United Kingdom . | |

OTHER PUBLICATIONS

"Luggage Control With X-Ray Eyes", Linkenbach et al. Siemens Review, vol. 48, no. 6, Nov./Dec. 1981.
"Principles, History, & Status of Dual-Energy Computerized Tomographic Explosives Detection", Roder, Journal of Testing & Evaluation vol. 13, no. 3, May 1985, pp. 211–216.
"Automated X-Ray Bomb Detection Techniques", Bisignani et al., Electro Conf. Record, vol. 4, 1979, pp. 1–13.

Primary Examiner—Janice A. Howell
Assistant Examiner—John C. Freeman

[57] ABSTRACT

An x-ray scanner for detecting plastic articles has an x-ray source which generates a fan-shaped x-ray beam through which an article to be examined is moved. A primary radiation detector array is disposed at a side of the article opposite to the x-ray source and functions to provide a normal x-ray image identifying metal articles. Additional detectors, which detect scatter radiation are disposed around the examination space at a distance from the primary radiation detector. The scatter radiation detectors detect scattered radiation characteristic of that produced by plastic articles. Signals from the scatter radiation detectors are processed, by which the presence of a plastic article can be identified.

1 Claim, 1 Drawing Sheet

X-RAY SCANNER FOR DETECTING PLASTIC ARTICLES

BACKGROUND OF THE INVENTION

1. Field of the Invention

The present invention is directed to x-ray scanning devices of the type wherein an article to be examined is moved between an x-ray source and a radiation detector, and in particular to the types of x-ray scanners suitable for examining baggage at airports.

2. Description of the Prior Art

X-ray scanners are known in the art which include an xray source having a diaphragm for generating a fan-shape x-ray beam. An article to be examined is moved, such as on a conveyor, through the fan-shaped x-ray beam. A series of radiation detectors are disposed on an opposite side of the article from the x-ray source. The detector is disposed such that the two marginal rays of the x-ray beam, which essentially completely permeates the examination space, are incident at the extreme edges of the detector. The signals obtained from the detector are processed, and an image constructed therefrom is displayed on a monitor.

X-ray scanners of this type are utilized for detecting weapons, particularly at airports. The images produces with such conventional devices show low-absorption articles indistinctly, due to the high voltage of, for example, about 140 kV required for metal penetration. Such articles, such as plastic explosives, can therefore be overlooked in luggage packed in a mixed fashion.

SUMMARY OF THE INVENTION

It is an object of the present invention to provide an x-ray scanner of the type described above such that the quantity and distribution of plastic articles in the luggage can be detected, so that the identification of a plastic explosive is possible with high reliability.

The above object is achieved in accordance with the principles of the present invention by the use of a plurality of detectors for stray or scatter radiation generated by the x-ray beam, the scatter radiation detectors being arranged around the examination space at a distance from the primary detector. The presence and approximate spatial distribution of larger plastic articles is utilized as a criteria for suspicion, which may trigger further action, such as a physical inspection.

In addition to the primary radiation beam, the stray or scatter components of the x-radiation are also evaluated, such scatter radiation being relatively high due to the low absorption of hydrocarbons in comparison to other materials. A rough identification of the quantity and distribution of plastic articles in the article being examined is thereby adequate. Due to the increasing miniaturization of detonators and detonator wires, a good resolution x-ray transmission image having high grey scale dynamics and a low dose load on the goods to be radiated is assured, this being generated with the x-ray scanner using a conventional fan-shaped x-ray beam generated by a stationary slit diaphragm (collimator) and with a scintillator photodiode array disposed directly within the x-ray beam.

In addition to being used for transmission image generation, the fan-shaped x-ray beam is also used as the primary beam for the scatter radiation to be detected. The stray radiation is received by a plurality of large-area detectors arranged around the examination space. The detector signals from the scatter radiation can be integrated together to obtain a signal corresponding to the total quantity of plastic present in the article being examined. In addition, the x-coordinate of the plastic (the direction of conveyance through the unit of the article being examined) can be identified based on a time scale, and the approximate y-coordinate and z-coordinate can be identified from a correlation of the individual detector signals.

The detector for the stray radiation may be a planar scintillator with the light therefrom being transmitted onto a highly sensitive detector, for example a photomultiplier, by means of a known optical apparatus (Fresnel lens, light-conducting bundle, mirrored chamber, etc.). In a preferred embodiment, however, a light-sensitive semiconductor, for example a photodiode, is used as the photodetector, this being covered by a small mechanical modulator having a fixed modulation frequency. In order to suppress the unwanted quiescent dc current (dark current) in such semiconductors, the detector signal is only selectively amplified at the modulation frequency. The highly sensitive detector fashioned in this manner is significantly smaller and more cost-beneficial than a photomultiplier.

DESCRIPTION OF THE PREFERRED EMBODIMENTS

Figure 1:
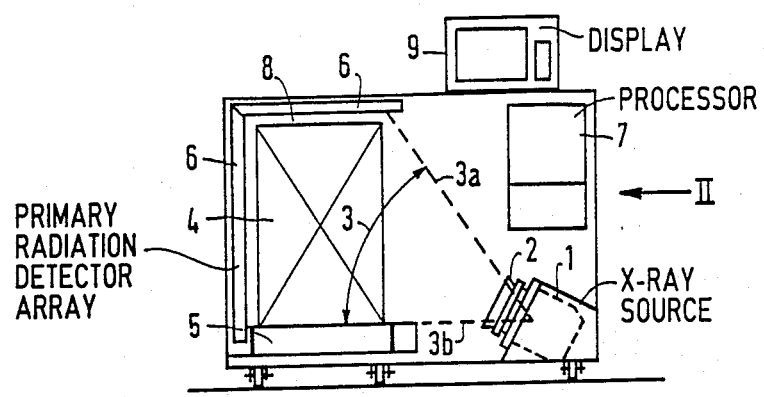
FIG. 1 is a section view through an x-ray scanner constructed in accordance with the principles of the present invention.

The x-ray scanner shown in FIG. 1 includes an x-ray source 1 which emits a fan-shaped x-ray beam 3 through a diaphragm or collimator 2, which completely permeates the article 4 to be examined which is moved through the scanner on a conveyor 5. The conveyor 5 may be in the form of a conveyor belt having a conveying direction proceeding perpendicularly to the plane of the drawing. The conveyor belt is shown in more detail in FIG. 2.

The two marginal rays 3a and 3b of the x-ray beam 3 are incident at the extreme edges of a primary radiation detector array 6, consisting of a plurality of individual detectors arranged in a right angle. The output signals of these detectors are individually supplied to a processor 7 wherein the signals are electronically processed. The processor 7 includes an image storage having one memory row for each individual detector. An x-ray shadow image is thereby generated line-by-line as the article 4 is moved relative to the x-ray beam 3. This image is reproduced on a monitor 9. The two marginal rays 3a and 3b thereby substantially completely permeate the examination space 8, so that articles 4 of any size can be completely transilluminated.

Figure 2:
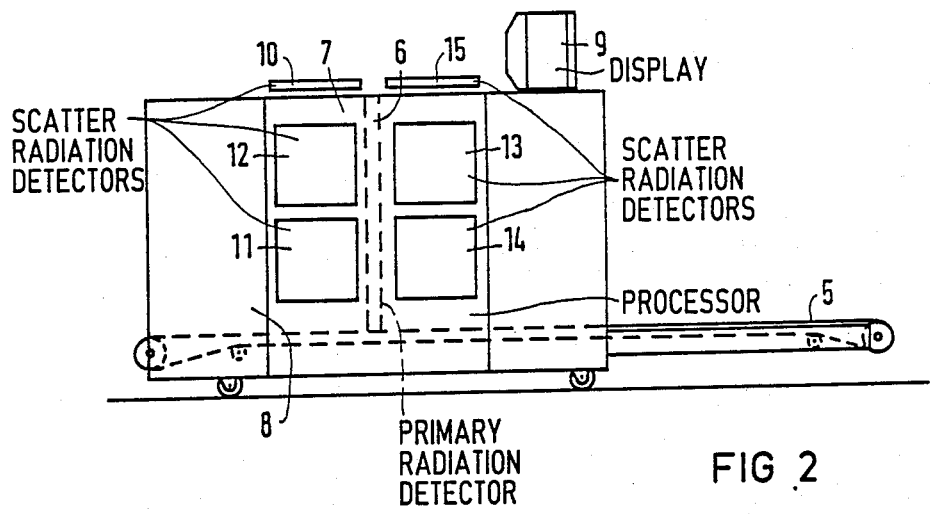
FIG. 2 is a side view of the x-ray scanner shown in FIG. 1.

As shown in FIG. 2, in addition to the primary radiation detector array 6, a plurality of scatter or stray radiation detectors 10, 11, 12, 13, 14 and 15 are provided which detect stray or scatter radiation also generated by the x-ray beam 3. The detectors 10, 11, 12, 13, 14 and 15 are arranged around the examination space 8 at a distance from the array 6. Plastic articles, such as plastic explosives, within the article 4 being examined cause a pattern of scatter radiation which, upon detection by the detectors 10 through 15 and with processing in the processor 7, are used to identify the quantity and location of the plastic article. The presence of plastic explosive can thus be identified using the stray radiation based on the scatter of the primary radiation in plastic parts.

Although modifications and changes may be suggested by those skilled in the art it is the intention of the inventor to embody within the patent warranted hereon all changes and modifications as reasonably and properly come within the scope of their contribution to the art.

We claim as our invention:

1. An x-ray scanner for detecting plastic in articles to be examined comprising:

an x-ray source which emits a fan-shaped x-ray beam in a propagation direction defined by two marginal rays;

means for moving an article to be examined through said x-ray beam;

a primary radiation detector disposed for receiving radiation attenuated by said article, said primary radiation detector being disposed such that said marginal rays are incident at respective extreme edges thereof;

a plurality of scatter radiation detectors disposed spaced from said primary radiation detector behind said article in said propagation direction such that scatter radiation from said article is incident on said scatter radiation detector, said scatter radiation being indicative of plastic in said article; and means for separately processing signals from said primary radiation detector and said scatter radiation detectors based on the absorption characteristics of plastic so as to identify the presence of plastic within said article.

* * * * *